United States Patent [19]

Barra

[11] Patent Number: 4,699,716

[45] Date of Patent: Oct. 13, 1987

[54] VARIABLE-THICKNESS SECTOR FOR A ROTARY DISC-TYPE FILTER

[75] Inventor: Jean Barra, Gardanne, France

[73] Assignee: Aluminium Pechiney, Paris, France

[21] Appl. No.: 849,460

[22] PCT Filed: Jul. 2, 1985

[86] PCT No.: PCT/FR85/00182

§ 371 Date: Feb. 25, 1986

§ 102(e) Date: Feb. 25, 1986

[87] PCT Pub. No.: WO86/00543

PCT Pub. Date: Jan. 30, 1986

[30] Foreign Application Priority Data

Jul. 4, 1984 [FR] France ............... 84 11051

[51] Int. Cl.$^4$ .............................................. B01D 33/26
[52] U.S. Cl. ..................................... 210/486; 210/542

[58] Field of Search ............... 210/486, 330, 331, 541, 210/542

[56] References Cited

U.S. PATENT DOCUMENTS 3,438,505 4/1969 Luthi ................................... 210/486

Primary Examiner—Frank Sever
Attorney, Agent, or Firm—Oblon, Fisher, Spivak, McClelland, & Maier

[57] ABSTRACT

A filtration sector for making up a filtration disc comprising a rigid frame imparting its shape thereto, supports for filter cloth within the frame and a member for connection to a hollow driveshaft of a rotary filter, said shaft containing liquid and gaseous fluid collectors, which is characterized in that said sector is of an increasing internal thickness from its peripheral end to its end in the vicinity of the hollow driveshaft (2).

4 Claims, 5 Drawing Figures

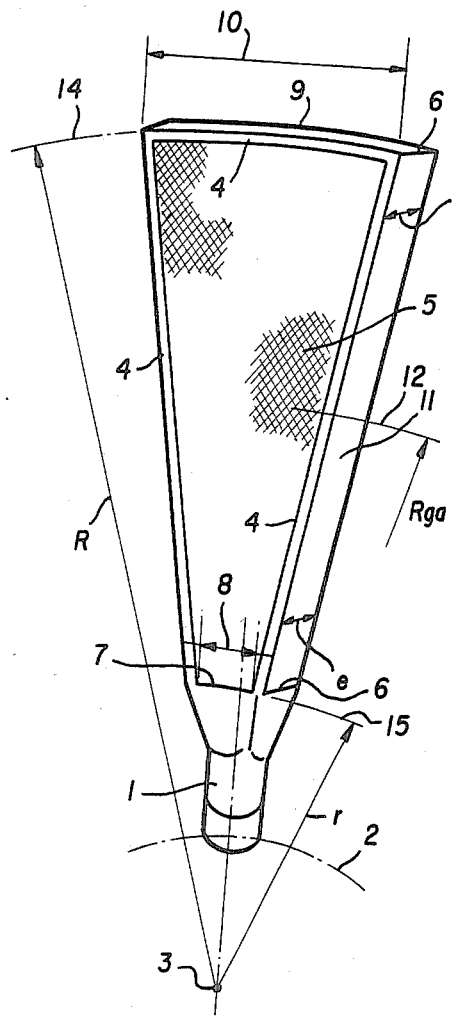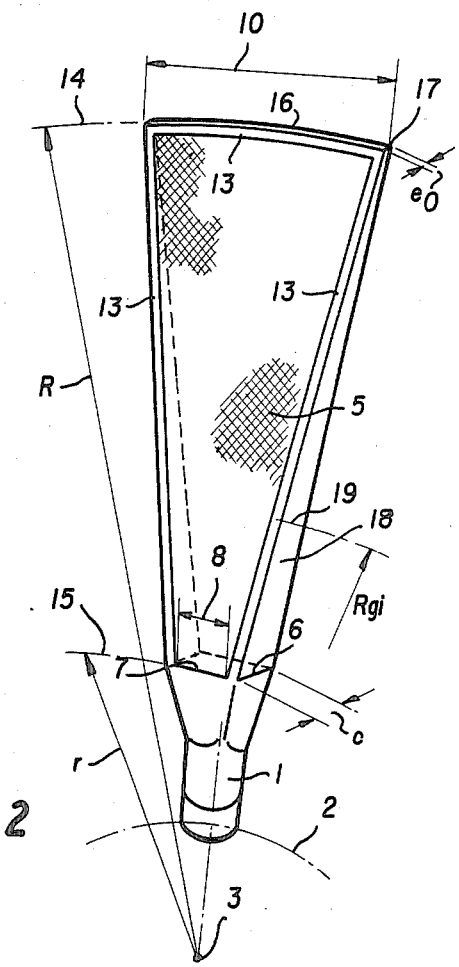

VARIABLE-THICKNESS SECTOR FOR A ROTARY DISC-TYPE FILTER

BACKGROUND OF THE INVENTION

1. Field of the Invention

The invention concerns variable-thickness sectors which are intended to form a disc for a rotary filter which may comprise a plurality of discs.

2. Discussion of Background

It has long been known for a continuous, liquid or gaseous phase and a dispersed, solid or liquid phase, initially forming a suspension resulting for example from an operation of attacking an ore, to be separated by filtration.

For that purpose, the suspension is passed over a support such as a grid, cloth, membrane, etc. on which the solid particles are deposited, forming a cake of variable thickness, while the liquid phase constituting the filtrate passes through the filtration texture and is then collected by any collecting means.

Depending on the characteristics of the suspension to be filtered such as for example their concentration of dry matter, the size of the solid materials, suitability for separation, aggressiveness of the medium and the degree of classification required, the man skilled in the art is required to choose a suitable piece of equipment, from the many technologies which are available on the market.

Among the filtration methods which are described in the specialist literature, one is used very frequently and considered to be of value in the field of separating liquid and solid phases of suspensions resulting from operations of attacking ores using hydrometallurgical processes: that filtration method involves using disc-type rotary filters such as those described for example in "Chemical Engineer's Handbook", page 978, by John H. PERRY, edition No 5, Graw Hill Book Company, 1950.

As described, the disc-type rotary filters comprise a plurality of discs which are fixed perpendicularly to a horizontal hollow shaft forming ducts in which various effects are produced such as suction, blowing etc. Each disc is formed by a plurality of independent sectors fitted with wire gauzes and/or textile filter bags, which are connected to the above-mentioned horizontal hollow shaft.

In the filtration operation, the discs provided with their sectors dip into a trough containing the suspension to be filtered, the solid phase being caused to cling to the filter cloths by suction while the separated liquid phase flows away in the collectors of the horizontal shaft which is provided with at least one distributor, by means of connections existing between each sector and the shaft itself. The solid phase which is disposed on the filter cloth is then drained off when it passes into the free air and then removed by blowing air in counterflow relationship through the filter surfaces.

Now, it is well known that each rotary disc is formed by sectors, each of which consists of a rigid frame which imparts its shape to the sector, the frame containing the filter cloth support and a member for connection to the hollow collecting and drive shaft.

In accordance with the known art, the filtration cloth support is generally formed by performed metal materials such as for example flat or corrugated perforated sheet metal in order to have the minimum contact with the filter cloth. The two cloth supports which face is provided with a cloth support. The two cloth supports which are fitted into the frame of the sector are maintained at a constant spacing from each other by bracing members which fix the internal thickness of the sector, said thickness being defined by the amount of liquid phase to be discharged by way of the base of the sector, that is to say, close to the shaft, at the location where the sector is of smallest width. In other cases, the two filtration cloth supports and the bracing members which connect them may comprise for example a single corrugated sheet, the height of corrugation thereof constituting the internal thickness of the sector which is required for the discharge flow of liquid phase.

Thus, in the prior art, the thickness of a sector is constant from its periphery to the end which is in the vicinity of the shaft.

However, such constant-thickness sectors suffer from the major disadvantage of having a consequential internal volume which contains a substantial amount of the liquid phase which is discharged during the drainage step simultaneously with the fraction of liquid phase impregnating the solid phase deposited on the faces of the sector. However, the step of draining the liquid phase, which is fixed by the filtration step and the physical position of the sector at the moment of the blowing operation, is generally insufficient to permit complete removal of the liquid phase which is in the sector. Once the blowing step occurs, the fraction of the aqueous phase which is still in the sector is projected through the filtration cloths, re-wetting the solid phase which is still present on the cloth. That causes a reduction in the level of efficiency of the draining operation.

However, such constant-thickness sectors also suffer from another major disadvantage. In fact, even if the duration of the draining step is sufficient to remove from the sector the whole of the liquid phase which is initially present and which originates from the draining operation, it is often found that a part of the liquid phase is still present in the collector of the shaft at the moment at which the blowing operation is carried out. The presence of the liquid phase in that way causes a reduction in the section of the collector for the flow of air therethrough, thus increasing the pressure drops and accordingly reducing the level of efficiency of the blowing operation. It is true to say that such a disadvantage may be limited by increasing the diameter of the collector or by inclining the collector. However, those two options give rise to a fresh disadvantage which is an increase in the diameter of the collecting and driving shaft and all the equipment connected therewith, such as the distributor, bearings and sealing means for the shaft where it passes through the tank.

Faced with the above-mentioned disadvantages, the applicants, continuing their research, discovered and developed a sector for a disc-type filter, which reduces the internal volume of the sector while retaining a flow section which is sufficient, at the location where the width of the sector is at its smallest, that is to say in the vicinity of the shaft, to permit discharge of the liquid phase contained in the sector and the collector before the blowing operation is carried out.

SUMMARY OF THE INVENTION

The filtration sector according to the invention, in order to make up a filtration disc comprising a rigid frame imparting its shape thereto, supports for filtration cloth within the frame and a member for connection to a hollow drive shaft of a rotary filter, said shaft containing liquid and gaseous fluid collectors, is characterised in that said sector is of an increasing internal thickness from its peripheral end to its end in the vicinity of the hollow drive shaft.

As in the prior art, the internal thickness in the vicinity of the shaft is so determined as to provide an adequate section for discharge of the liquid phase impregnating the solid phase deposited on the cloth of the sector and the amount of liquid phase contained in the sector, which is frequently less than the amount of liquid phase contained in a sector of the prior art, which is of the same dimensions but which is constant in thickness.

As in the prior art, the amount of liquid phase to be discharged by way of the section of the sector at its periphery is virtually nil.

According to the invention, the internal thickness of the sector at its periphery, which can be denoted by "$e_o$" may be zero if the supports for the cloths are formed for example by flat surfaces. However, for practical reasons regarding the design of the sector and also when the cloth supports are other than flat surfaces such as for example corrugated, perforate or imperforate or honeycomb-like panels, the thickness "$e_o$" of the periphery complies with the inequality $0 \leq e_o \leq e$, wherein e is the thickness of the sector, being constant in the prior art, and at the end in the vicinity of the shaft in the case of the invention, but preferably being closer to "0" than "e", that is to say desirably between "0" and "e/10" when the cloth supports permit it.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an orthogonal view of a filtration sector according to the prior art;

FIG. 2 corresponds to FIG. 1 but shows the invention;

DETAILED DESCRIPTION OF THE PREFERRED EMBODIMENTS

Figure 3:
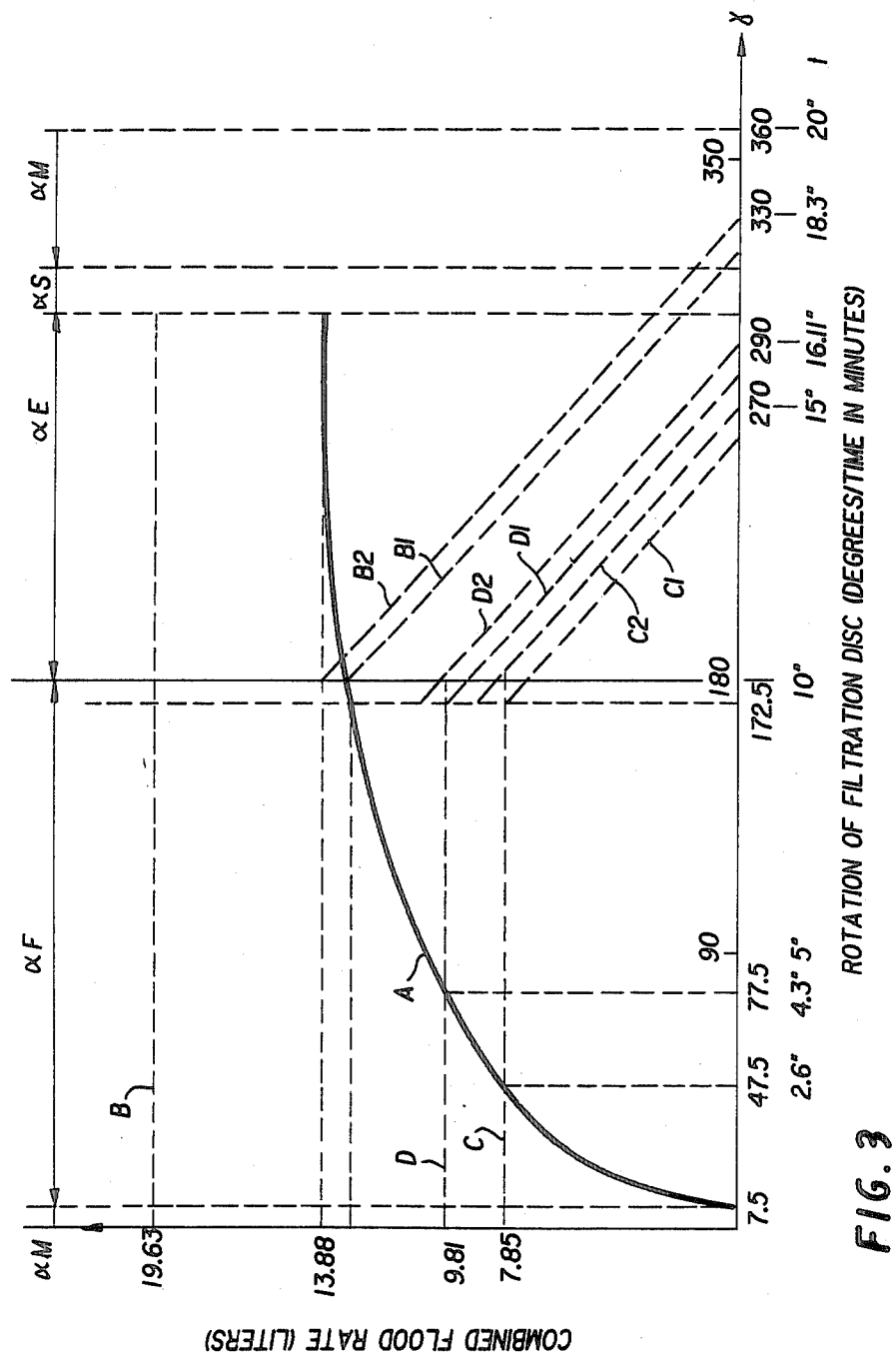
FIG. 3 is a graph showing flow rate per revolution through the filter of the invention.

Referring to FIG. 1 illustrating the prior art, a filtration sector communicates by a suitable connected or communicating means 1 forming part of the sector with the collecting and drive shaft 2 which rotates about its geometrical axis 3. The communicating means 1 is fixed with respect to a frame 4 within which cloth supports 5 are disposed on respective sides, the supports 5 being maintained at a constant distance from each other, thereby imparting to the sector a thickness "e", as indicated at 6, equal at the periphery 14, up to the end 15 in the vicinity of the shaft 2. The internal section 7 of the sector, which is afforded for the liquid phase contained in the sector to pass therethrough has one end disposed at a distance "r" from the axis of rotation 3. The internal section 7 is defined by the width 8 of the sector in the vicinity of the shaft 2 and by the thickness "e" at 6.

The section 9 at the periphery or second and which is at a distance "R" from the axis 3 is defined by the width of the sector 10 at the periphery 14 and the thickness "e" as indicated at 6.

The internal volume of such a sector may be calculated from Guldin's theorem: "If S is the area of a planar surface rotating about an axis which is located in the plane thereof and which does not include same, the volume of revolution produced by said surface is $V = 2\pi RgS$, Rg being the distance between the centre of gravity of the area S and the axis of rotation."

Thus, in the situation shown in FIG. 1 which corresponds to the prior art, the surface $S_2$ (11) is defined by the product of (R−r) and "e" as indicated at 6. Its centre of gravity 12 is disposed at a distance $Rg_{(a)}$ equal to $[(R−r)/2 + r]$ from the axis of rotation 3. Thus, the internal volume $V_2$ of the sector in the case of the prior art is as follows:

$$V_a = (R-r)e.2\pi Rg_{(a)}/n$$

n being the number of sectors forming a disc.

Referring to FIG. 2 which illustrates the invention, a filtration sector communicates by a suitable means 1 forming part of said sector with the collecting and drive shaft 2 which rotates about its geometrical axis 3. The communicating means 1 is fixed with respect to a frame 13 within which concurrent cloth supports (5) are disposed on respective sides, thereby imparting to the sector a thickness which increases from the periphery 14 to the end 15 in the vicinity of the shaft 2. The internal section 7 of the sector which is afforded to the flow of liquid phase contained in the sector is the same as in the axis of rotation 3. The internal section 7 is defined by the width of the sector 8 in the vicinity of the shaft 2 and by the thickness "e" as indicated at 6. Thus, the width 8 and the thickness "e" are the same for the sectors according to the prior art and according to the invention. The section 16 at the periphery 14 which is disposed at a distance "R" from the axis 3 is defined by the width 10 of the sector at said periphery and by the thickness "$e_o$" as indicated at 17.

The internal volume $V_i$ of such a sector is also calculated by Guldin's theorem. Thus, in the case shown in FIG. 2 which corresponds to the invention, the surface area $S_i$ (18) is defined by the product of (R−r) and $(e_o + e)/2$. Its centre of gravity 19 is located at a distance $Rg_{(i)}$ equal to: $[Rg_{(i)} - [(R-r)/3 \, (2e + e_o)/(e + e_o)]]$ from the axis of rotation 3. Thus, the internal volume $V_i$ of the sector in accordance with the invention is:

$$V_i = (R-r)(e_o + e) Rg_{(i)}/n$$

wherein n is again the number of sectors forming the disc.

In an alternative embodiment which corresponds to the particular situation in which "eO" is zero, the internal volume Vi is determined by the following relationship:

$$V_i = (R-r)e\pi Rg_{(i)}/n$$

Hence, between the internal volumes of sectors $V_i$ in accordance with the invention and $V_a$ in accordance with the prior art, there is a ratio $V_i/V_a$ which complies with the inequality:

$$(R + 2r)/3(R + r) \leq V_i/V_a < 1$$

thus showing that the internal volume $V_i$ of a sector according to the invention is always less than the internal volume $V_a$ of the same sector in accordance with the prior art, that is to say, of constant thickness "e".

In accordance with the alternative embodiment corresponding to the particular case in which "e" is zero, the ratio between the volumes $V_i/V_a$ complies with the equality:

$$V_i/V_a = (R+2r)/3(R+r)$$

By virtue of the sector according to the invention, it is possible for the collectors and the shaft of a rotary disc-type filter to be better dimensioned in order to achieve more rapid evacuation of the liquid phase and an improved level of efficiency in the blowing operation.

EXAMPLE
(illustrated by FIGS. 1 to 5)

In the course of research into and development of a filtration sector for a disc-type filter with increasing thickness "$e_o$" from the periphery 14 to the end 15 of a thickness "e" in the vicinity of the shaft 2, the applicants studied two sectors with the same filtration area and the same flow section, one being of a constant thickness "e" belonging to the prior art (FIG. 1) and the other being of variable thickness, in accordance with the invention (FIG. 2).

The characteristics of the sections were as follows:

|  | PRIOR ART (FIG. 1) | INVENTION (FIG. 2) |
|---|---|---|
| R | 20 dm | 20 dm |
| r | 5 dm | 5 dm |
| filtration area | 0.833 m2 | 0.833 m2 |
| e | 0.4 dm | 0.4 dm |
| $e_o$ | 0.4 dm | 0 |
| flow section (7) | 0.48 dm2 | 0.48 dm2 |

The internal volume $V_a$ of the sector according to the prior art was 19.63 liters while the internal volume $V_i$ of the sector according to the invention was 7.85 liters.

The filter on which were mounted sectors forming discs which were 50% immersed rotated at a speed of 3 revolutions per minute in order to give a level of liquid phase productivity of 3000 liters.$h^{-1}.m^{-2}$.

Under those conditions the amount of liquid phase passing through the filtration cloth during the filtration and draining steps corresponding to a rotary furnace, was equal to 13.88 liters.

On the basis of measurements in respect of the flow rate of the liquid phase, carried out on a disc-type filter, by varying the amount of dry matter in the suspension to be filtered, so as to obtain different thickness of the solid phase deposited, on the filtration cloth of the sectors, it was possible to establish the cumulative flow rate curve A (FIG. 3) in respect of the aqueous phase through the progressively charged filtration cloth, related to the filtration surface area of a sector. The abscissae axis $\gamma$, in degrees, represents on a first scale a 360° revolution of a sector and, on a second scale, the times (t) in seconds corresponding to a revolution in 20 seconds (3 revolutions per minute) and also the steps $\alpha F$ corresponding to the filtration angle, $\alpha E$ corresponding to the drainage angle, $\alpha S$ corresponding to the blowing angle and $\alpha M$ corresponding to the non-productive dead angle, the combination of those angles corresponding to one revolution. The ordinate axis represents in liters the combined flow rate of the liquid phase which passes through a sector and the internal volume of the different sectors being studied.

As can be seen from curve A, the flow rate of the liquid phase through the filtration cloth and passing through the interior of the sector is more substantial at the beginning of the filtration step $\alpha F$ than at the end, by virtue of the absence or the small thickness of the solid phase on the cloth at the beginning of that step and its maximum thickness at the end.

Likewise, it may be noted that, during the draining step $\alpha E$, the flow rate of the liquid phase through the cloth is low since it corresponds to the discharge of a part of the liquid phase present in the solid phase on the cloth.

On the basis of that curve, it was possible to ascertain the influence that the internal volume of a sector may have on the time at which the sector begins to discharge into the collectors of the shaft the liquid phase which passes through the sector and on the time at which the interior of the sector is free of the liquid phase which was passing therethrough.

Figure 4:
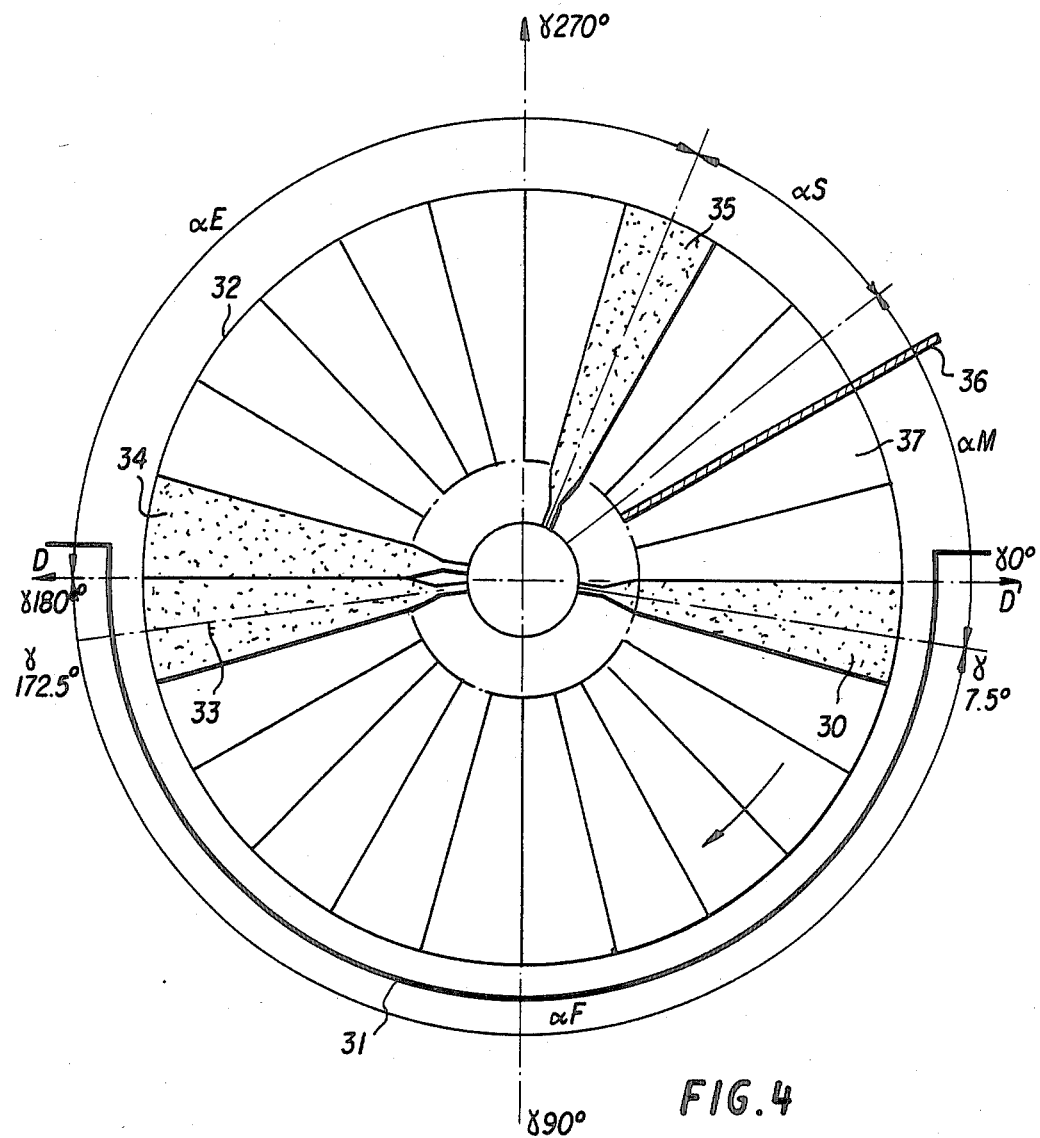
FIGS. 4 and 5 show a schematic elevational view of a rotary disc according to two embodiments of the invention.

With the prior-art sector having an internal volume of 19.63 liters (reference B), it was found that the internal volume of the sector was never completely filled with the liquid phase which passes therethrough and that, as shown in FIG. 4, the commencement of discharge of the liquid phase occurs when the sector has already covered an angle $\gamma$ of about 172.5° with respect to its starting position (in respect of which $\gamma$ is equal to 7.5°).

FIG. 4 in association with FIG. 3 clearly illustrates the beginning of discharge of the liquid phase. In fact, if we consider the starting position 30 of a sector which has just been immersed with respect to the level DD' of the suspension in the trough 37 (corresponding to 50% immersion of the drive shaft 32), that position 30 corresponds to an angle $\gamma$ which is in fact equal to 7.5° when the disc 32 comprises for example 24 sectors with an apex angle of 15°. When the sector 30 reaches position 33, it has already covered an angle of 172.5° with respect to its starting position and the angle $\gamma$ as measured in the direction of rotation of the disc 32 is then 180°. Beyond $\gamma = 180°$, the sector occupies the position 34 corresponding to the drainage angle $\alpha E$. Then, in position 35, it passes into the blowing region corresponding to the angle $\alpha S$, in the course of which the cake deposited on the faces of the sector is deflected by deflectors 36. Finally, the sector 35 passes into a non-productive region represented by the angle $\alpha M$.

Referring to FIG. 3, from the angle $\gamma = 7.5°$ at which the filtration stop $\alpha F$ begins and up to the angle $\gamma = 180°$ corresponding to the end of the filtration step $\alpha F$, the sector B of the prior art receives, without discharge, the amount of liquid phase passing through the cloth, as represented by A, and from $\gamma = 180°$, that sector begins to discharge the liquid phase that it contains, into the collectors of the shaft, for a discharge period as indicated by the straight line B1 whose slope has been previously determined on an experimental basis in relation to a moving sector. The straight line B1 corresponds to the cumulative flow rate of the discharge of the liquid phase stored in the sector from $\gamma = 7.5°$ to $\gamma = 180°$ to which must be added the flow rate of the liquid drainage phase which begins at $\gamma=180°$ and which gives the straight line B2 representing the combined flows.

Thus, it will be seen that there is a danger of discharge of the liquid phase passing through the sector being extended to $\gamma=350°$, thus covering the whole of the drainage step $\alpha E$ and intercepting the blowing step $\alpha S$, causing the aqueous phase to be driven into that sector and causing the drained solid phase to suffer from re-wetting on the cloth.

Figure 5:
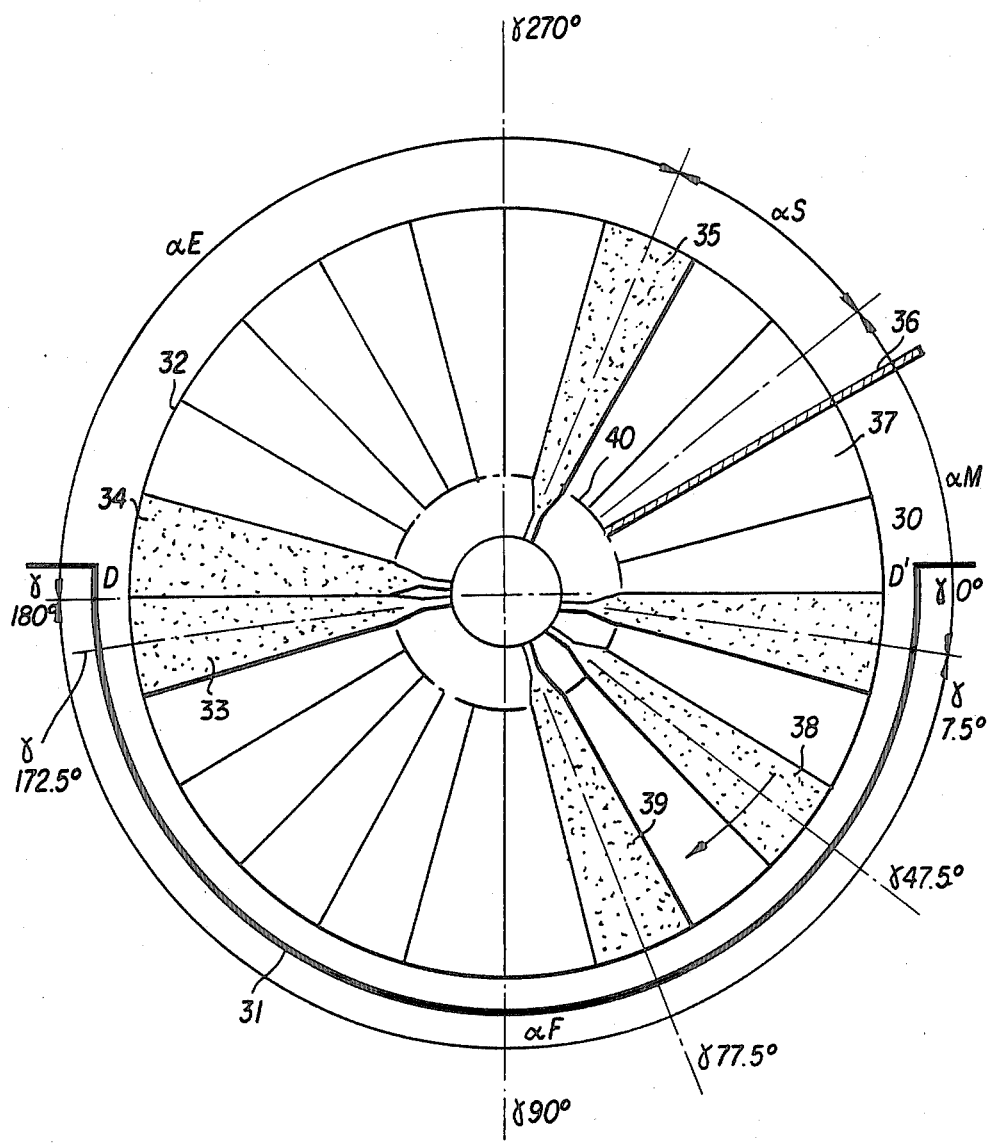

With a sector C in accordance with the invention, in which $e_0=0$ and with an internal volume of 7.85 liters, it was found that the sector began to fill at the beginning of the filtration step for $\gamma=7.5°$ and that, in accordance with the combined flows curve A, it was entirely filled with $\gamma=47.5°$. FIG. 5 shows that such a sector, completely filled with aqueous phase, begins to discharge that phase into the shaft, under the force of gravity, when it reaches the position 33 at which $\gamma=172.5°$ whereas it began to fill up as in the prior art and at the position 30 with $\gamma=7.5°$. In fact, that sector was already full when it was in position 38 corresponding to the angle $\gamma=47.5°$, that is to say, the excess of liquid phase was already flowing into the shaft collector 40 at that time.

Referring to FIG. 3, from the position corresponding to the angle $\gamma=172.5°$, the sector is emptied of the liquid phase with a combined flow as illustrated by the straight line C1 with a slope which is close to that of the straight line B1. To that combined flow there must be added on the one hand the flow corresponding to the end of the filtration operation, for $172.5°<\gamma<180°$ and on the other hand the flow of the liquid drainage phase which begins with the angle $\gamma=180°$ and which gives the straight line C2 in respect of the combined flows.

Thus, it was found that discharge of the liquid phase which passes through the sector is concluded with the angle $\gamma=270°$, that is to say, well before the blowing step $\alpha S$ begins.

Once the sector according to the invention is emptied of all the liquid phase with the angle $\gamma=270°$, it is found that the liquid phase which is still present in the collector is discharged before the blowing step begins, thus increasing the effectiveness of the blowing operation and preventing the solid phase on the filtration cloth from being wetted again.

Comparison between the prior-art sector B and the sector according to the invention C shows that the liquid phase passing through that sector is discharged into the shaft:

in the prior art, from the position $\gamma=180°$ to $\gamma=330°$, representing a discharge time between 10 and 18.3 seconds, that is to say, a discharge of 13.88 liters in 8.3 seconds, in the invention, from position $\gamma=47.5°$ to $\gamma=270°$, representing a discharge time between 2.6 and 15 seconds, that is to say, the discharge of 13.88 liters in 12.4 seconds.

With a sector D according to the invention in respect of which $e_o=e/10$ and with an internal volume of 9.81 liters, it was also found that the sector began to fill up at the beginning of the filtration step with $\gamma=7.5°$ and that, in accordance with the cumulative flows curve A, it was entirely filled with $\gamma=77.5°$. FIG. 5 shows that such a sector, entirely filled with aqueous phase, begins to discharge that phase into the shaft under the force of gravity when it reaches the position 33 with the angle $\gamma=172.5°$, whereas it began to fill as in the prior art and at the position 30 with the angle $\gamma=7.5°$. In fact, the sector was already full when it was in the position 39 corresponding to the angle $\gamma=77.5°$, that is to say, the excess of liquid phase was already flowing into the shaft collector at that time.

As shown in FIG. 3, from the position corresponding to the angle $\gamma=172.5°$, the sector is emptied of the liquid phase with a combined flow as illustrated by the straight line D1 whose slope is close to that of the straight line C1. To that combined flow D1 must be added the flow of the liquid drainage phase which begins with the angle $\gamma=180°$ and which gives the straight line D2 in respect of the combined flows.

Thus, it was found that discharge of the liquid phase passing through the sector is completed at the angle 290°, that is to say, before the blowing step $\alpha S$ begins.

Since the sector according to the invention is emptied of all the liquid phase at the angle $\gamma=290°$, it is found that the liquid phase which is still present in the collector is discharged before the blowing step begins, thus enhancing the effectiveness of the blowing operation and preventing the solid phase on the filter cloth from being wetted again.

Thus, comparison between the prior-art sector B and the sector according to the invention D shows that the liquid phase passing through the sector is discharged into the shaft;

in the prior art, from position $\gamma=180°$ to 330°, representing a discharge time between 10 seconds and 18.3 seconds, that is to say, the discharge of 13.88 liters in 8.3 seconds, and in the invention, from position $\gamma=77.5°$ to $\gamma=290°$, representing a discharge time between 4.3 and 16.11 seconds, that is to say, the discharge of 9.81 liters in 11.81 seconds.

Hence, there is little difference between the discharge times, as between the sectors C and D according to the invention, while noting however that the end of the operation of emptying the sector D is closer to the blowing operation $\alpha S$ than the sector C, thus giving rise to a reduction in the emptying time for the collectors.

I claim:

1. A filtration sector of a filtration disc, comprising:
   reinforcement means for providing said sector with a rigid elongate sector shape;
   filtration fabric support means mounted on said reinforcement means to define an internal volume of said sector;
   connector means fixed to one longitudinal and of said sector shape for connecting said sector shape with a hollow drive shaft while communicating the entirety of said internal volume with the interior of said drive shaft, and
   means for minimizing an amount of a liquid in said internal volume by an amount sufficient for said internal volume to drain during a drainage portion of a rotation of the filtration disc,
   wherein a width of said sector shape tapers outwardly from said one end toward a second longitudinal end in a circumferential direction of the axis of the drive shaft, and wherein said means for minimizing includes an internal thickness $e_o$ of said sector shape decreasing from said one end toward said second end.

2. A filtration sector of a filtration disc according to claim 1 wherein said internal thickness $e_o$ of the sector at said second end is zero.

3. A filtration sector of a filtration disc according to claim 1 wherein said internal thickness $e_o$ at said second end corresponds to the inequality: $0 \leq e_o < e$ wherein "e" is the thickness of the sector at said one end.

4. A filtration sector of a filtration disc according to claim 3 wherein said thickness $e_o$ corresponds to the inequality: $0 \leq e_o \leq e/10$.

* * * * *